July 10, 1928.

C. E. QUICK

AIRCRAFT MOTOR

Filed Nov. 23, 1925

1,676,667

Inventor
Charles E. Quick
By Hardway & Cathey
Attorneys

Patented July 10, 1928.

1,676,667

UNITED STATES PATENT OFFICE.

CHARLES E. QUICK, OF HOUSTON, TEXAS.

AIRCRAFT MOTOR.

Application filed November 23, 1925. Serial No. 70,821.

This invention relates to new and useful improvements in an air craft motor.

One object of the invention resides in the provision of a motor of the character described wherein provision is made for the circulation of cool air throughout the interior of the crank case and about the crank shaft and connecting rod bearings whereby said bearings will be kept comparatively cool.

Another object of the invention is to provide a motor of the character described wherein provision is made for supplying the carbureter with the headed air taken from the interior of the crank case thus conducing to a more effective vaporization of the motive fuel.

With the above and other objects in view this invention has particular relations to certain novel features of construction, operation and arrangement of parts an example of which is given in this specification, and illustrated in the accompanying drawings, wherein:—

Figure 1:
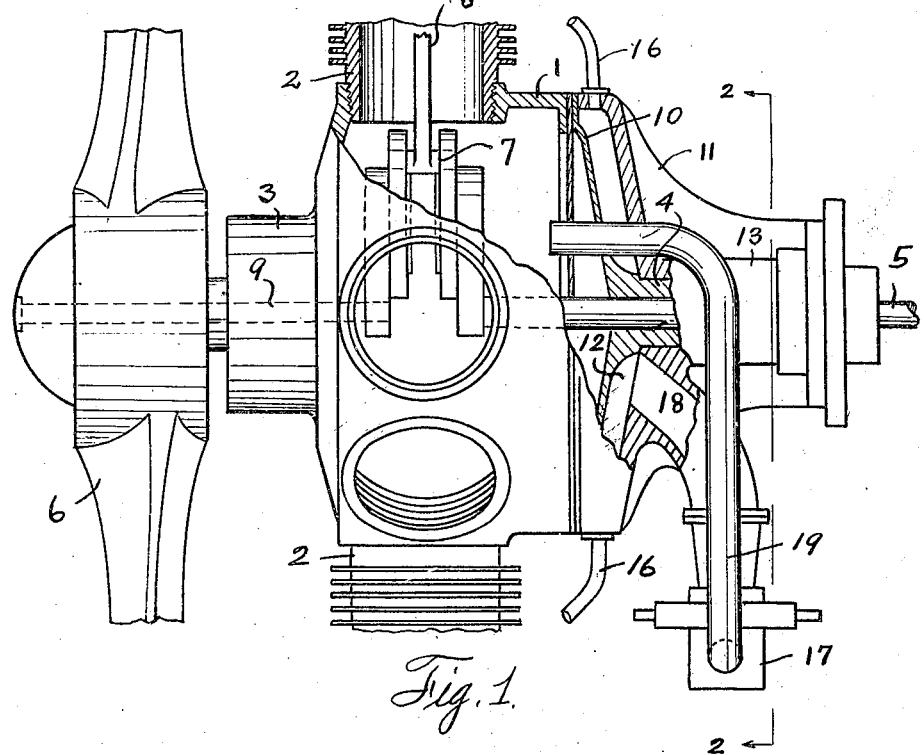
Figure 2:
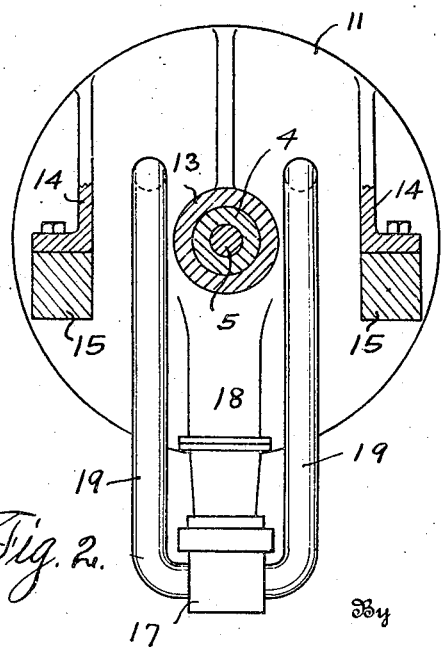

Figure 1 shows a fragmentary side elevation, partly in section, of an internal combustion motor of the radial type, embodying the invention herein disclosed, and Figure 2 shows a cross section view thereof, taken on the line 2—2 of Figure 1.

Referring now more particularly to the drawings, wherein like numerals of reference designate similar parts in each of the figures the numeral 1 designates the crank case of the motor, anchored to which are the radiating cylinders 2. Rotatably mounted in the front and rear bearings 3 and 4 of the crank case there is a crank shaft 5. Secured to the forward end of this shaft there is the propeller 6 and within the crank case the shaft 5 is formed with an eccentric wrist 7 to which the inner ends of the piston connecting rods, as 8, are connected. There is an air duct 9 leading through the crank shaft 5 from its forward end and terminating within the crank case.

The bearing 4 is sleevelike in form and integral with its forward end there is a circular concavo-convex web 10 with its concaved side toward the crank case and with its margin abutting said crank case. There is a circular housing 11 whose margin abuts against the margin of the web 10 and clamps said web in position, said housing and web being suitably secured to the motor crank case 1.

The housing has its forward side concaved to space it from said web, thus forming an intake chamber 12 and the housing is extended rearwardly forming a sleeve 13 which fits closely over the bearing 4. This housing also has suitable integral rearwardly extending flanges 14, 14 whose lower edges are overturned forming supports which rest on the main side members 15, 15, of the fusilage.

Leading from the intake chamber 12 into the respective combustion chambers of the cylinders, are the intake pipes 16.

There is a carbureter 17 connected to the intake manifold 18 which enters the chamber 12, and there are two main air inlet pipes 19, 19, connected, at their upper ends into the crank case chamber, and whose other ends are connected into the air intake of the carbureter.

In operation air is drawn into the interior of the crank case through the duct 9 and keeps the crank shaft and its bearings, as well as the connecting rod bearing from becoming excessively hot, and said air passes thence through the pipes 19 to the carbureter and the heats the fuel and secures an effective vaporization thereof.

What I claim is:—

1. An internal combustion motor including a crank case having a closed crank chamber and an intake chamber at the rear end thereof, an intake manifold entering the intake chamber, a crank shaft rotatably mounted in the crank case and having a crank in said crank chamber, said shaft having an air inlet duct leading from its forward end and terminating in said crank chamber and forming the only air inlet into said crank chamber, a carbureter associated with said intake manifold, an air outlet line leading from the crank chamber and connected into the carbureter.

2. An internal combustion motor including a crank case having an internal crank chamber, radiating cylinders carried by said crank case, a crank shaft having a crank in said chamber, pistons in said cylinders operatively connected with said crank, said shaft having an air duct leading from its forward end terminating in said chamber, said duct forming the only air inlet into said crank chamber, a concavo-convex web carried by the rear crank shaft bearing with its concaved side toward the crank case, a circular housing whose margin abuts the margin of said web, said housing having its forward side concaved to space it from the web, thus forming an intake chamber at the rear end of the motor, an intake manifold connected into an intake chamber, a carburetor associated with said manifold, an air outlet connected at one end into the crank case chamber and at its other end into said carburetor.

3. An internal combustion motor including a crank case having an internal crank chamber, radiating cylinders carried by said crank case, a crank shaft mounted in suitable bearings carried by the crank case and having a crank in said chamber, pistons in said cylinders operatively connected with said crank, said shaft having an air duct leading from its forward end and terminating in said chamber and forming the only means for admitting air into the crank chamber, a web carried by the rear crank shaft bearing, a circular housing whose margin abuts the margin of said web, said housing having its forward side concaved to space it from the web, thus forming an intake chamber at the rear end of the motor, an intake manifold connected into said intake chamber, a carburetor associated with said manifold, an air inlet pipe connected at one end into the crank case chamber and at its other end into said carburetor and intake pipes leading from said intake chamber and adapted to be connected into the combustion chambers of the respective cylinders.

4. An internal combustion motor including a crank case having a crank chamber and an intake chamber at the rear end of the motor, an intake manifold entering the intake chamber, a crank shaft rotatably mounted in the crank case and having a crank in said crank chamber, said shaft having an air inlet duct leading from its forward end and terminating in said crank chamber and forming the only means for admitting air into the crank chamber, a carburetor associated with said intake manifold, an air outlet line leading from the crank chamber and connected with the carbureter, radial cylinders carried by the crank case, pistons in said cylinders, operatively connected with said crank and intake pipes leading from the intake chamber and adapted to be connected into the combustion chambers of the respective cylinders.

In testimony whereof I have signed my name.

CHARLES E. QUICK.